(12) United States Patent
Nielsen et al.

(10) Patent No.: US 6,238,562 B1
(45) Date of Patent: May 29, 2001

(54) PROCESS FOR BIOLOGICAL PURIFICATION OF WASTE WATER WITH REVERSING OPERATION

(75) Inventors: Marinus Nielsen, Virum; Claus Poulsen Dahl, Brønshøj, both of (DK)

(73) Assignee: Krüger A/S, Søborg (DK)

( * ) Notice: Subject to any disclaimer, the term of this patent is extended or adjusted under 35 U.S.C. 154(b) by 0 days.

(21) Appl. No.: 09/508,641

(22) PCT Filed: Sep. 16, 1998

(86) PCT No.: PCT/DK98/00396

§ 371 Date: May 4, 2000

§ 102(e) Date: May 4, 2000

(87) PCT Pub. No.: WO99/16717

PCT Pub. Date: Apr. 8, 1999

(30) Foreign Application Priority Data

Sep. 16, 1997 (DK) .................................................. 1064/97

(51) Int. Cl.[7] .................................. C02F 3/30; C02F 3/02
(52) U.S. Cl. .............................................. 210/605; 210/623
(58) Field of Search ...................................... 210/605, 623

(56) References Cited

U.S. PATENT DOCUMENTS 5,228,996  7/1993  Lansdell .

FOREIGN PATENT DOCUMENTS

| 3147920 | 10/1983 | (DE) . |
| 123814 | 8/1972 | (DK) . |
| 131279 | 6/1975 | (DK) . |
| 454508 | 5/1988 | (SE) . |
| 9602468 | 2/1996 | (WO) . |

*Primary Examiner*—Chester T. Barry
(74) *Attorney, Agent, or Firm*—Dykema Gossett PLLC

(57) ABSTRACT

A process and an apparatus for biological purification of waste water by the activated sludge method, wherein the waste water is continuously passed through one or more treatment zones and a clarification zone in the same tank under such conditions that an accumulation of sludge occurs in the treatment zone from which the treated waste water is withdrawn, and wherein the direction of flow through the tank is reversed, so that the non-treated waste water, after accumulation of sludge has occured at the outlet end of the tank, in a succeeding period, is introduced at this end, and treated waste water is withdrawn at the opposite end.

4 Claims, 4 Drawing Sheets

☐ Aerobic   ▨ Stratification

Aerobic    Anoxic    Anaerobic    Stratification

Aerobic     Stratification

PROCESS FOR BIOLOGICAL PURIFICATION OF WASTE WATER WITH REVERSING OPERATION

Figure 1:
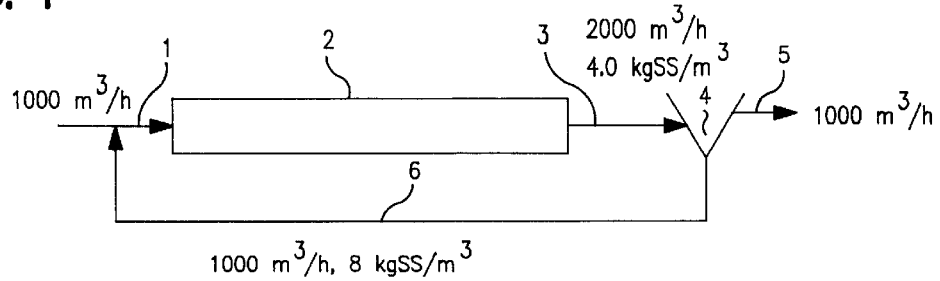

The invention relates to a process for biological purification of waste water by the activated sludge method, whereby the waste water is passed continuously through one or more treatment zones and a clarification zone under such conditions that an accumulation of sludge takes place in the treatment zone from which the treated waste water is withdrawn.

It is known that the efficiency of a biological purification of waste water by the activated sludge method increases with increasing amounts of sludge in the treatment zones, and that in order to obtain high sludge concentrations it has been necessary to employ high sludge recirculation ratios, i.e. high ratios of sludge, which is recirculated from the clarification zone to the first treatment zone, to the amount of non-treated waste water.

However, the large amount of sludge causes problems in case of increased supply of water, e.g. in case of heavy showers. In such a case the amount of sludge in the clarification tank will start increasing due to overload, which ultimately entails that the sludge is entrained out into the recipient with resultant pollution hereof.

It has therefore been attempted to find a way in which it is possible, perhaps temporarily in case of peak loads, to reduce the load on the clarification tank, so that the situation described above is avoided.

Bent Tholander has described a method which is based on a basic module consisting of a continuously aerated tank and two side tanks with alternating function as aeration tanks or clarification tanks, where the waste water is always supplied to the centre tank. If two such modules are connected, a system is obtained which in case of particularly heavy showers can be adjusted, so that two clarification tanks are in operation.

PCT-application No. PCT/DK95/00309 (WO 96/02468) discloses a method of obtaining high sludge concentrations without using high sludge recirculation ratios by maintaining for a period such conditions in one or more treatment zones that sludge precipitation occurs herein, and by passing, in a succeeding period, a mixture of non-purified waste water and recirculated sludge to the zone which in the preceding period served as sludge precipitation zone.

By using the above mentioned method it has been possible to increase the sludge concentration in the treatment zone from 4 to about 5.9 $kg/m^3$ and to reduce the sludge recirculation ratio from 1.0 to 0.5, which has resulted in a reduction of the load on the clarification tank from about 8.000 kg/h to about 3.000 kg/h.

In practice, the method described above presupposes that at least two, and preferably four, separate tanks and a clarification tank be used for treating the waste water.

This entails comparatively high costs for the construction and operation of water purification plants in which the method described above can be used.

DE 3 147 920 discloses a method for biological purification of waste water, where the waste water is periodically passed through two or three physical sub-tanks. The method is based on one of the three sub-tanks being isolated for a period in which non-treated waste water is supplied to the centre tank before the flow is subsequently reversed, and flow again takes place through all three tanks.

U.S. Pat. No. 5 228 996 also discloses a method for biological treatment of waste water. The tank is divided into three elongated sub-tanks, each of which is in turn divided into 4 cells. The method is based on a series of phases in which the water is periodically introduced into each of the three sub-tanks, and where aerobic and anaerobic conditions, respectively, can be maintained in the individual cells.

From these two patents it is consequently known to reverse the direction of flow in the tank. However, in both cases it is a matter of three separate tanks which intercommunicate via bottom flaps and one-way valves, respectively. This physical division into three sub-tanks with restricted possibilities of transport of material between them, and the periodical isolation of one of the tanks entail that it is not possible to fully utilize the purification capacity of the sludge.

The process according to the invention is characterized in that the treatment is carried out in the same undivided tank, and that the non-treated waste water is introduced into one end of the tank for a period which is sufficiently long for an accumulation of sludge to take place at the outlet end of the tank, whereafter the direction of flow is reversed so that the non-treated waste water in a succeeding period is introduced at this end for a period which is sufficiently long for an accumulation of sludge to take place at the opposite end of the tank, from which end waste water is withdrawn.

By making such reversal of the supply of non-treated waste water to the tank in which the waste water is subjected to purification, it is achieved that the treatment is carried out in the presence of large amounts of sludge which, as mentioned above, results in an increased capacity of the purification.

It could be expected that the non-treated waste water, which has been introduced into the tank immediately before performing reversal for introduction of waste water at the end which used to be outlet end, would entail that the waste water withdrawn after the reversal had an unacceptably high content of contaminants, e.g. in the form of unreacted nitrogen compounds.

However, it has surprisingly turned out that this is not so, which presumably is due to the fact that such compounds are immediately adsorbed onto the sludge particles, and are consequently retained in the tank.

Thus, it is quite unexpectedly possible to completely reverse the process in a single step without the treated waste water loosing its quality.

That the treatment at the same time can take place in only one single, undivided tank entails that the initial costs of construction can be significantly reduced.

When implemented in existing plants, the volume load can be significantly increased because of the large amount of sludge which is retained in the tank, as the purification efficiency is increased, and the load on the clarification tank is reduced.

In the following the invention is described in more detail with reference to the drawings in which:

FIG. 1 shows a conventionally operated plant for the purification of waste water with a treatment zone and a clarification zone.

Figure 2A:
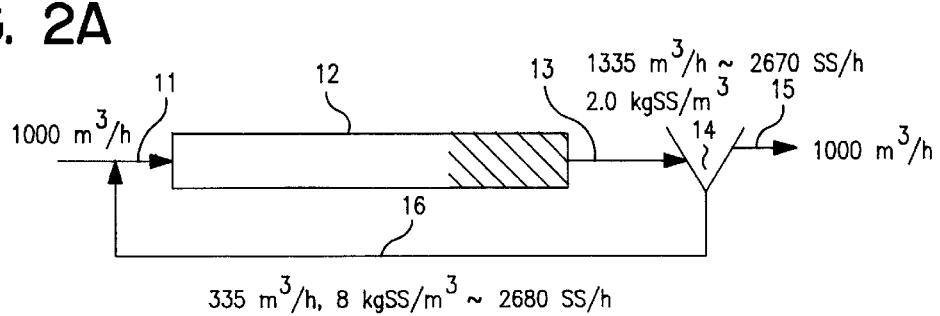
Figure 2B:
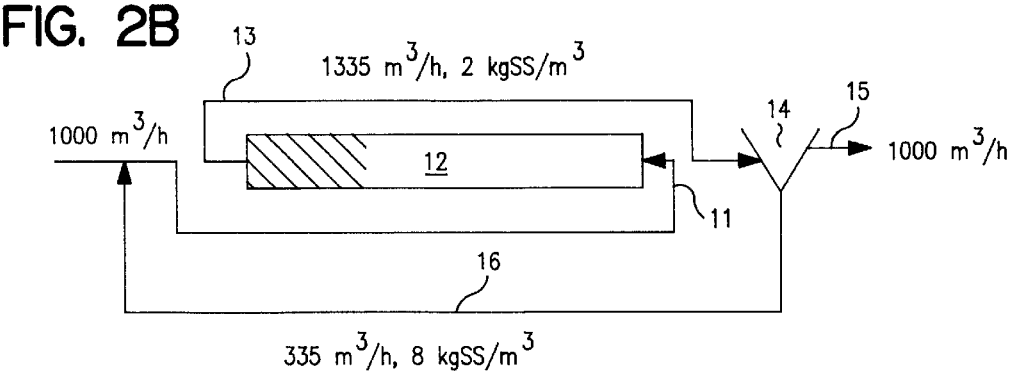

FIGS. 2A and 2B respectively show two operational phases of a plant for the purification of waste water operated by the process according to the invention with a treatment zone and a clarification zone.

Figure 3A:
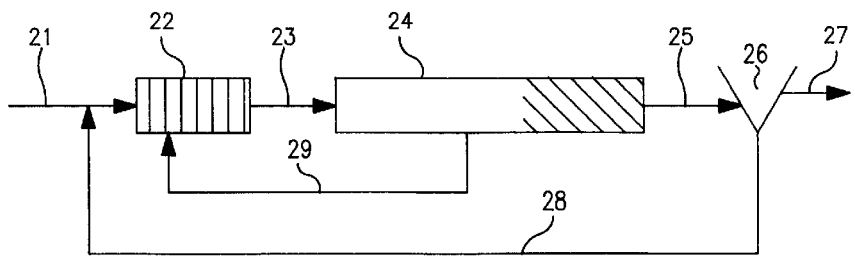
Figure 3B:
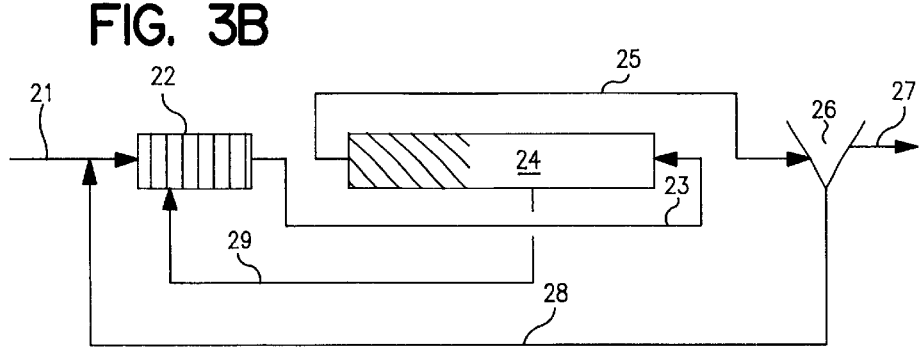

FIGS. 3A and 3B respectively show two operational phases of a plant for the purification of waste water operated by the process according to the invention with several treatment zones.

Figure 4A:
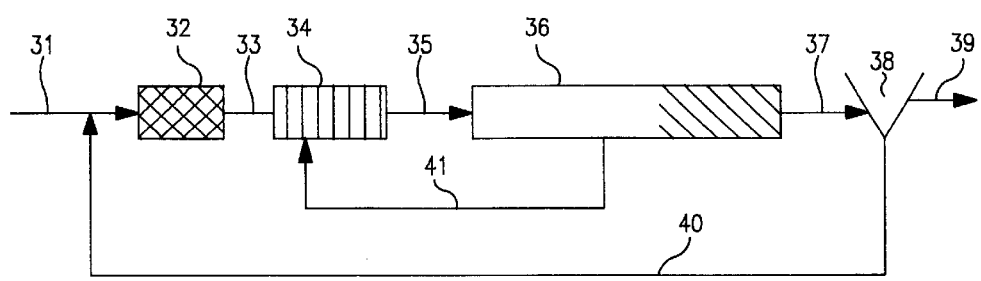
Figure 4B:
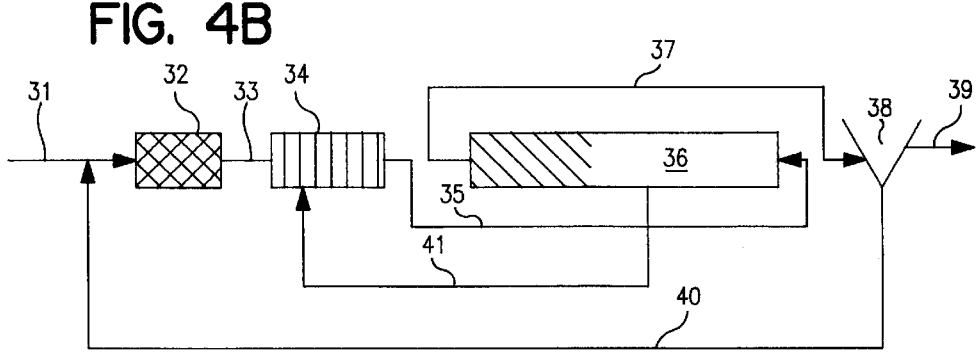
Figure 4B:
Figure 4B:
Figure 4B:
Figure 4B:

FIGS. 4A and 4B respectively show operational phases of an additional plant for the purification of waste water operated by the process according to the invention with several treatment zones.

Figure 5A:
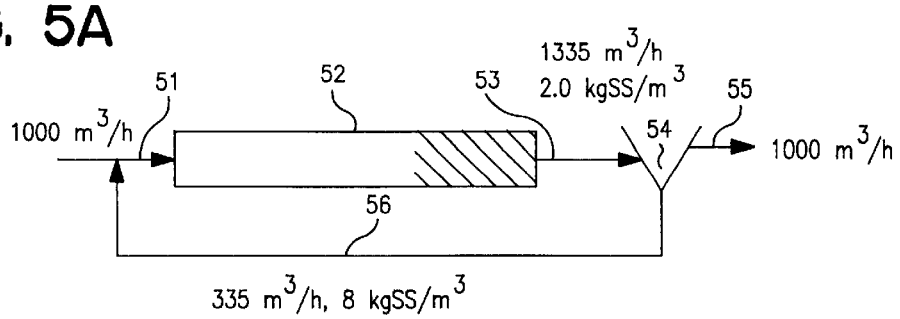
Figure 5B:
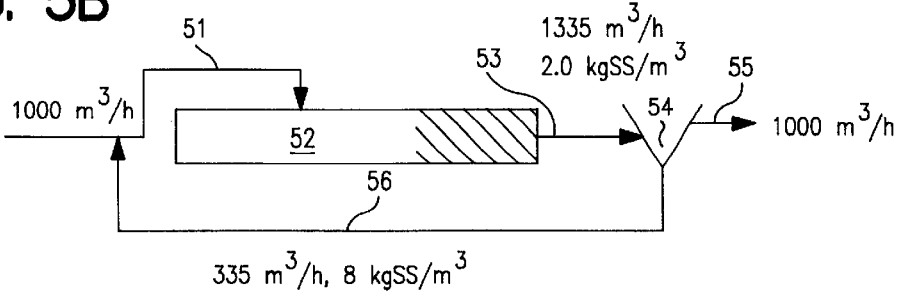
Figure 5C:
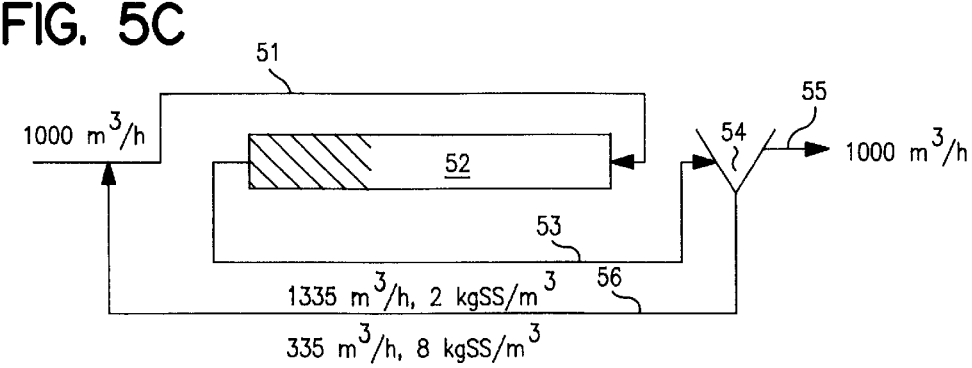
Figure 5D:
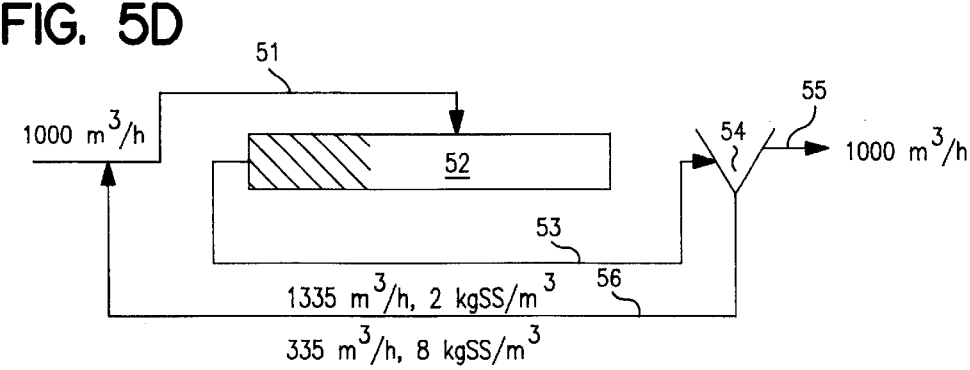

FIGS. 5A and 5D respectively show operational phases of a purification plant operated by the process according to the invention with two intermediate phases.

Figure 6A:
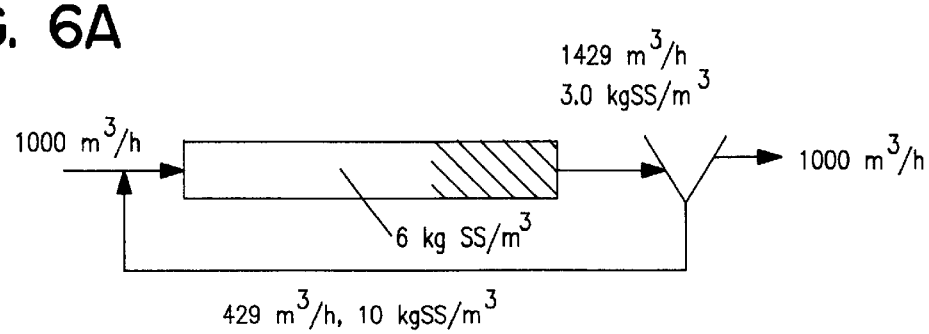
Figure 6B:
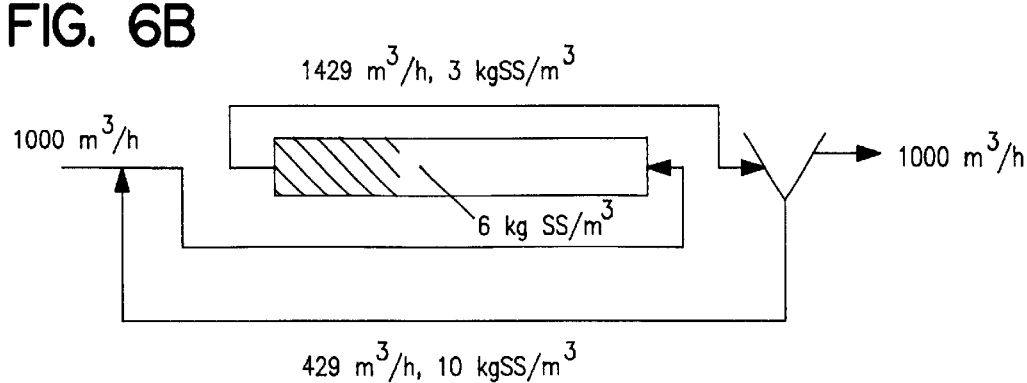
Figure 6B:
Figure 6B:

FIGS. 6A and 6B show an exemplary calculation.

FIG. 1 illustrates a conventional plant with an inlet 1, which opens into an aerobic process tank 2, from where a conduit 3 leads to a clarification tank 4, from where again there is an outlet 5, and a recirculation conduit 6 which leads back to the inlet 1.

By this type of conventional operation the waste water is passed into the process tank 2, where aeration and stirring are performed along the full length of the tank so as to obtain approximated complete mixing. The outlet from the process tank 2 to the clarification tank 4 consequently has a concentration corresponding to the process concentration in the tank, for example 4 $kgSS/m^3$, which again means that a large amount of sludge is carried over into the clarification tank. As a result, a comparatively large clarification tank and a high recirculation ratio are required in order to maintain the sludge concentration in the process tank.

FIGS. 2A and 2B illustrate a plant for carrying out the process according to the invention, where the waste water in a first phase (FIG. 2A) via an inlet 11 is introduced into an aerobic process tank 12 from where a conduit 13 proceeds to a clarification tank 14, from where again there are an outlet 15, and a recirculation conduit 16 which leads back to the inlet 11.

In a second phase (FIG. 2B), the waste water is via the inlet 11 introduced into the tank 12 at the end which used to be outlet end, further on out through the conduit 13 to the clarification tank 14 with the outlet 15.

By controlling aeration and stirring a stratification is obtained at the outlet end of the process tank. As a result, there is a concentration at the top of the tank which is smaller than the average concentration in the tank. The flow which is withdrawn from here to the clarification tank thus has a lower concentration of for example 2 $kgSS/m^3$, which reduces the load on the clarification tank.

During the first phase, the sludge will accumulate at the outlet end of the process tank, but by shifting to the second phase, where the end which used to be the inlet end is now the outlet end, the sludge will slowly be passed back to the opposite end. Thus, by repeated shifts between the first and second phases a kind of rippling effect is obtained, which means that the sludge return flow can be significantly reduced simultaneously with the load on the clarification tank being eased.

FIGS. 3A and 3B show an inlet 12 which leads to an anoxic tank 22, from where a conduit 23 proceeds to an aerobic process tank 24, from where again a conduit 25 proceeds into a clarification tank 26 having an outlet 27. From the clarification tank 26, recirculation is effected via a conduit 28 to the inlet 21, just as from the process tank 24, recirculation is effected via a conduit 29 to the anoxic tank 22.

In a first phase (FIG. 3A), the waste water from the anoxic tank 22 is passed to one end of the anaerobic tank 24, and further onto the clarification tank 26. In a second phase (FIG. 3B), the waste water is passed to the other end of the tank so as to obtain the rippling effect described above.

In this embodiment an anoxic zone has thus been introduced before the process tank, where nitrate in the presence of micro-organisms is converted into free nitrogen (denitrification), and to which recirculation takes place from the aerobic tank. The sludge load on the clarification tank is still low as a result of the process described for FIGS. 2A and 2B.

FIGS. 4A and 4B show an inlet 31 which leads to an anaerobic tank 32, from where a conduit 33 proceeds to an anoxic tank 34, from where again a conduit 35 proceeds to an aerobic process tank 36, from where a conduit 37 leads to a clarification tank 38 and a recirculation circuit 41, the latter leading back to the anoxic tank 34. From the clarification tank 38 there is an outlet 39 and a recirculation conduit 40, the latter leading back to the inlet 31. The recirculation conduit 42 can optionally be extended by the conduit section 43, so that recirculation is also effected to the anaerobic tank 32.

This illustrates a purification plant operated by the process according to the invention, the sludge rippling to and fro by shifts between a first phase (FIG. 4A) and a second phase (FIG. 4B), where additionally an anaerobic zone is introduced in order to obtain biological phosphorous removal and/or selector effect, which results in an improved sludge as regards precipitation properties. At the same time, recirculation is, as above, effected from the aerobic tank to the anoxic tank.

FIGS. 5A–5D illustrate an additional embodiment of the process according to the invention. The plant for this comprises an inlet 51 into an aerobic process tank 52, from where a conduit 53 proceeds to a clarification tank 54, from where again there is an outlet 55, and a recirculation conduit 56 which leads back to the inlet 51.

In this embodiment, however, an intermediate phase is introduced, so that the waste water in a first phase (FIG. 5A) flows into one end of the process tank, whereas in a second phase (FIG. 5B) it is supplied at some point between the two ends of the tank, and in a third phase (FIG. 5C) it is supplied to the end which in the first phase was outlet end. In a fourth phase (FIG. 5D), the waste water is again supplied at some point between the two ends of the tank.

This process ensures that at no time is waste water discharged from a zone which during a preceding phase was inlet zone. This is intended as an additional safety precaution if it should turn out that the purification efficiency when using only two phases is too low.

COMPARATIVE EXAMPLE (conventional operation)

When operating a purification plant as shown in FIG. 1 there is, by way of experience, a concentration of suspended substance (SS) of 8 $kgSS/m^3$ in the return flow 6 from the clarification tank 4, which means, as compared with an assumption that overall in the process tank 2 there is a concentration of 4 $kgSS/m^3$ at approximated complete mixing, that an amount (here 1000 $m^3/h$) corresponding to 100% (recirculation ratio=1.0) should be recirculated in order to maintain a concentration of 4 $kgSS/m^3$ in the process tank. This requires that twice the amount of flow (2000 $m^3/h$) must be passed through the conduit 3 from the process tank to the clarification tank in order to obtain a suitable return flow and maintain the process concentration of 4 $kgSS/m^3$. This entails a load on the clarification tank of 8000 kgSS/h.

Example 1

FIGS. 2A–2B show an embodiment of the process according to the invention. Because of the stratification in the outlet end of the tank with resultant precipitation of sludge, there is a sludge concentration of 2.0 $kgSS/m^3$ in the outlet from the tank. As a result, this low concentration entails that the sludge return flow via the conduit 16 can be significantly reduced. By simultaneously shifting between the first and second phases, a rippling effect is obtained, so that the sludge which for a period is upconcentrated at the outlet end in a second period is passed back again. This is yet a factor contributing to being possible in this embodiment to reduce the return flow to 335 m$^3$/h, which is a reduction by 67% as compared with conventional operation (FIG. 1). By the process according to the invention it is thus possible to significantly reduce the costs for recirculation, simultaneously with the load on the clarification tank being reduced.

Example 2

FIGS. 6 and 7 show an embodiment of the process according to the invention, where the plant is designed to obtain a higher sludge concentration in the process tank as well as a reduction of the sludge load on the clarification tank.

In order to obtain a higher plant capacity, a process concentration of 6 kgSS/m$^3$ in the tank has been chosen here. Since by the process according to the invention, as described above, a stratification is obtained at the outlet end of the tank, the concentration in the outlet also in this case is lower, corresponding to the 3 kgSS/m$^3$. If the return flow is set at 429 m$^3$/h, a sludge load on the clarification tank of 4287 kgSS/h is obtained, as shown. Thus, as compared with conventional operation (FIG. 1) it is thus possible to save 57% of the costs for recirculation of return sludge. At the same time, a higher purification capacity is obtained due to the possibility of operating with a higher process concentration, and the load on the clarification tank is reduced by 46%.

What is claimed is:

1. A process for biological purification of waste water by the activated sludge method, wherein the waste water is continuously passed through one or more treatment zones and a clarification zone under such conditions that an accumulation of sludge takes place in the treatment zone from which the treated waste water is withdrawn, characterized in that the treatment is carried out in the same undivided tank, and that the non-treated waste water is introduced into one end of the tank for a period which is sufficiently long for an accumulation of sludge to occur at the outlet end of the tank, whereafter the direction of flow is reversed, so that the non-treated waste water in a succeeding period is introduced at this end for a period which is sufficiently long for an accumulation of sludge to occur at the opposite end of the tank, at which end treated waste water is withdrawn.

2. A process according to claim 1, characterized in that the waste water in an intermediate period is supplied to the tank at some point between what in a preceding period was the inlet end, and what was the outlet end.

3. A process according to claims 1, characterized in that the waste water is continuously passed through at least one anoxic and one aerobic treatment zone.

4. A process according to claims 1, characterized in that the waste water is continuously passed through at least one anaerobic, one anoxic, and one aerobic treatment zone.

* * * * *